United States Patent
Kosidlo (10) Patent No.: US 10,780,845 B2
(45) Date of Patent: Sep. 22, 2020

(54) RETENTION CLIP FOR VEHICLE MOLDING

(71) Applicant: Engineered Fastener Company, LLC, St. Louis, MO (US)

(72) Inventor: John Michael Kosidlo, White Lake, MI (US)

(73) Assignee: Engineered Fastener Company, LLC, St. Louis, MO (US)

( * ) Notice: Subject to any disclaimer, the term of this patent is extended or adjusted under 35 U.S.C. 154(b) by 31 days.

(21) Appl. No.: 16/272,299

(22) Filed: Feb. 11, 2019

(65) Prior Publication Data

US 2019/0248303 A1 Aug. 15, 2019

Related U.S. Application Data (60) Provisional application No. 62/629,389, filed on Feb. 12, 2018.

(51) Int. Cl.
*F16B 2/20* (2006.01)
*B60R 13/02* (2006.01)
(Continued)

(52) U.S. Cl.
CPC .......... *B60R 13/0206* (2013.01); *B60J 10/32* (2016.02); *F16B 2/20* (2013.01); *B60R 13/04* (2013.01)

(58) Field of Classification Search
CPC ...... B60R 13/0206; B60R 13/04; B60J 10/32; F16B 2/20; F16B 2/24; F16B 2/243;
(Continued)

(56) References Cited

U.S. PATENT DOCUMENTS

| 2,451,591 A | 10/1948 | Tinnerman et al. |
| 2,712,917 A | 7/1955 | Flora et al. |

(Continued)

FOREIGN PATENT DOCUMENTS

| DE | 202016100401 U1 | 7/2016 |
| EP | 1728687 A1 | 7/2009 |

(Continued)

OTHER PUBLICATIONS

English language translation of JP4026776 B2, downloaded from espacenet.com on Feb. 12, 2019; 22 pages.

(Continued)

*Primary Examiner* — Jack W Lavinder
(74) *Attorney, Agent, or Firm* — Howard & Howard Attorneys PLLC (57) ABSTRACT

A clip is disclosed for securing a molding to a flange of a vehicle. The clip has a first side wall and a second side wall each comprising an interior surface and an opposing exterior surface. The interior surfaces face one another and the exterior surfaces are shaped to engage the molding. Each of the side walls terminate at a distal edge providing a passage for the flange. A base connects the side walls at an end that is opposite the distal edges. A tab extends from the base and is disposed between the side walls. The tab and the interior surface of the second side wall define a pocket sized to fit the flange of the vehicle. The interior surface of the second side wall comprises a bump that extends towards and faces the tab. The tab and the bump are configured to engage the flange.

20 Claims, 7 Drawing Sheets

(51) Int. Cl.
*B60J 10/32* (2016.01)
*B60R 13/04* (2006.01)

(58) Field of Classification Search
CPC ...... F16B 2/245; Y10T 24/303; Y10T 24/304; Y10T 24/306; Y10T 24/307
See application file for complete search history.

(56) References Cited

U.S. PATENT DOCUMENTS

| | | | |
|---|---|---|---|
| D220,424 S | 4/1971 | Hindenburg | |
| 3,673,643 A | 7/1972 | Kindell | |
| 3,720,395 A | 3/1973 | Schuplin | |
| 4,144,642 A | 3/1979 | Wallshein | |
| 4,340,200 A | 7/1982 | Stegmeier | |
| 4,393,560 A | 7/1983 | Kato | |
| 4,402,118 A | 9/1983 | Benedetti | |
| 4,630,338 A | 12/1986 | Osterland et al. | |
| 4,644,612 A | 2/1987 | Osterland | |
| 4,712,341 A | 12/1987 | Harris, Jr. et al. | |
| 4,724,585 A | 2/1988 | Whitman | |
| 5,317,835 A | 6/1994 | Dupuy et al. | |
| 5,347,690 A | 9/1994 | Mansoor et al. | |
| 5,433,038 A | 7/1995 | Dupuy | |
| 5,566,510 A | 10/1996 | Hollingshead et al. | |
| 5,634,314 A | 6/1997 | Champagne | |
| 5,702,148 A | 12/1997 | Vaughan et al. | |
| 5,799,449 A | 9/1998 | Lyons et al. | |
| 5,846,631 A | 12/1998 | Nowosiadly | |
| 5,887,319 A | 3/1999 | Smith | |
| 6,141,837 A | 11/2000 | Wisniewski | |
| 6,279,207 B1 | 8/2001 | Vassiliou | |
| 6,353,981 B1 | 3/2002 | Smith | |
| 6,648,542 B2 | 11/2003 | Smith et al. | |
| 6,679,003 B2 | 1/2004 | Nozaki et al. | |
| 6,691,380 B2 | 2/2004 | Vassiliou | |
| 6,718,599 B2 | 4/2004 | Dickinson et al. | |
| 6,928,705 B2 | 8/2005 | Osterland et al. | |
| 7,159,926 B2 | 1/2007 | Ward et al. | |
| 7,188,392 B2 | 3/2007 | Giugliano et al. | |
| 7,278,189 B2 | 10/2007 | Smith | |
| 7,354,102 B2 | 4/2008 | Cave et al. | |
| 7,428,770 B2 | 9/2008 | Dickenson et al. | |
| 7,640,634 B2 | 1/2010 | Vassiliou | |
| D620,342 S | 7/2010 | Mikkelsen | |
| D625,580 S | 10/2010 | Giordano | |
| D674,685 S | 1/2013 | Dixon | |
| 8,371,069 B2 | 2/2013 | O'Sullivan et al. | |
| D690,583 S | 10/2013 | Sendra-Gonzalez et al. | |
| D732,382 S | 6/2015 | Zalanca et al. | |
| 9,091,114 B2 | 7/2015 | Franzen | |
| D762,106 S | 7/2016 | Lo et al. | |
| D762,456 S | 8/2016 | Lo et al. | |
| D762,457 S | 8/2016 | Lo et al. | |
| D767,372 S | 9/2016 | Itou et al. | |
| 9,440,596 B2 | 9/2016 | Huelke et al. | |
| 9,488,202 B2 * | 11/2016 | Komeno | F16B 21/075 |
| D811,869 S | 3/2018 | Gallion et al. | |
| D815,939 S | 4/2018 | Geiger et al. | |
| D816,474 S | 5/2018 | Ochi et al. | |
| D816,475 S | 5/2018 | Ochi et al. | |
| 10,119,606 B2 | 11/2018 | Ahmed et al. | |
| 2002/0046499 A1 | 4/2002 | Nozaki et al. | |
| 2002/0164200 A1 | 11/2002 | Wisniewski | |
| 2004/0083582 A1 | 5/2004 | Dickinson et al. | |
| 2007/0186389 A1 | 8/2007 | Smith et al. | |
| 2010/0300002 A1 | 12/2010 | Ertl | |
| 2011/0204671 A1 | 8/2011 | Baratin | |
| 2013/0031865 A1 | 2/2013 | Besedich et al. | |
| 2013/0093141 A1 | 4/2013 | Guellec | |
| 2013/0270855 A1 | 10/2013 | Fukui | |
| 2016/0101675 A1 | 4/2016 | Timmermann | |

FOREIGN PATENT DOCUMENTS

| | | |
|---|---|---|
| JP | 4026776 B2 | 12/2007 |
| JP | 4853352 B2 | 1/2012 |
| JP | 2017061173 A | 3/2017 |

OTHER PUBLICATIONS

English language translation of EP1728687 A1, downloaded from espacenet.com on Feb. 12, 2019; 18 pages.

English language translation of JP4853352 B2, downloaded from espacenet.com on Feb. 12, 2019; 29 pages.

English language translation of DE202016100401, downloaded from espacenet.com on Feb. 12, 2019; 16 pages.

English language translation of JP2017061173 A, downloaded from espacenet.com on Feb. 12, 2019; 29 pages.

* cited by examiner

RETENTION CLIP FOR VEHICLE MOLDING

CROSS-REFERENCE TO RELATED APPLICATIONS

The subject application claims priority to and all the benefits of U.S. Provisional Patent Application No. 62/629,389, filed Feb. 12, 2018, the entire contents of which are hereby incorporated by reference.

TECHNICAL FIELD

The disclosure relates to a retention clip for attaching a molding to a flange of a vehicle.

BACKGROUND

Automotive vehicles typically include door assemblies that comprise a door frame having a window opening and a window. The window is raised to close the window opening and lowered to open the window opening.

The window opening typically has a sheet metal flange that extends around a periphery of the window opening. The flange is typically formed by an outer piece of sheet metal that is coupled to an inner piece of sheet metal. Specifically, the inner and outer pieces of sheet metal are hemmed together. In one example, the outer piece of sheet metal is folded over the inner piece of sheet metal.

It is known to couple an exterior molding to the flange. The exterior molding may be, for example, weatherstrip, a decorative piece, or the like. In one example, the exterior molding is a DLO (day light opening) molding. The molding typically is installed at the top or bottom of a door of the vehicle and spans the top or bottom curvature of the door, e.g., from the side view mirror to a vertical molding on a rear door. In some instances, the molding may have a thin layer of finishing (e.g., chrome or silver) to give the window opening an aesthetic look.

Conventionally, clips are attached between the exterior molding and the window opening to retain the molding to the window opening. The retention clips engage the flange and the molding in a snap fit interlocking engagement.

Moreover, the hemming of the inner and outer sheet metal is subjected to rather large mechanical tolerances. In other words, the thickness of the hem may vary significantly from vehicle to vehicle. Conventional clips do not account for such variations. As a result, the fit between the molding, door frame and clip may be either too loose or too tight. Accordingly, prior retention clips fail to securely retain the molding to the flange for extended periods of time if the interlocking engagement is loose. On the other hand, if the interlocking engagement for prior retention clips is too tight, this provides significant challenges for installation/assembly. For example, certain clips can only be installed by applying a significant force to the molding/door frame and/or clip.

Moreover, the molding often includes a lip (or gimp) that engages the outer piece of sheet metal. The lip creates a seal to the outer piece of sheet metal to channel water on the exterior of the vehicle and to minimize air infiltration. The lip should be maintained against the sheet metal to avoid air and water leakage. Prior clips have failed to address challenges associated with repeatability and consistency in maintaining the lip of the molding against the sheet metal.

As such, there is a need to provide a clip that securely attaches the exterior molding to the vehicle flange, accounts for variable mechanical tolerances of the flange hem, is capable of fitting in tight spaces, and securely maintains the lip of the molding to the frame.

SUMMARY

This Summary introduces a selection of concepts in a simplified form that are further described below in the Detailed Description below. This Summary is not intended to limit the scope of the claimed subject matter nor identify key features or essential features of the claimed subject matter.

A clip is provided for securing a molding to a flange of a vehicle. The clip comprises a first side wall and a second side wall each comprising an interior surface and an opposing exterior surface. The interior surfaces face one another and the exterior surfaces are shaped to engage the molding. Each of the first and second side walls terminate at a distal edge providing a passage for the flange of the vehicle. A base of the clip connects the first and second side walls at an end that is opposite the distal edges. A tab extends from the base and is disposed between the first and second side walls. The tab and the interior surface of the second side wall define a pocket sized to fit the flange of the vehicle. The interior surface of the second side wall comprises a bump that extends towards and faces the tab. The tab and the bump are configured to engage the flange of the vehicle.

A trim assembly is provided for attaching to a flange of a vehicle. The trim assembly comprises a molding comprising an interior surface and a clip attached to the molding. The clip comprises a first side wall and a second side wall each comprising an interior surface and an opposing exterior surface. The interior surfaces face one another and the exterior surfaces are coupled to the interior surface of the molding to secure the clip to the molding. Each of the first and second side walls terminate at a distal edge providing a passage for the flange of the vehicle. A base connects the first and second side walls at an end that is opposite the distal edges. A tab extends from the base and is disposed between the first and second side walls. The tab and the interior surface of the second side wall define a pocket sized to fit the flange of the vehicle. The interior surface of the second side wall comprises a bump that extends towards and faces the tab. The tab and the bump are configured to engage the flange of the vehicle for securing the trim assembly to the flange of the vehicle.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Referring to the various Figures, a retention clip 10 is provided (hereinafter referred to as "clip"). The clip 10 is for a vehicle 12, and more specifically, for a frame 14 (see FIG. 5) of the vehicle 12. The frame 14 may be for a window opening of the vehicle 12, but can be for other frames 14 of the vehicle 12. The window opening may be for any type of vehicle, such as automotive, aerospace, marine, or the like.

The clip 10 is configured to retain an exterior trim component of the vehicle 12 to the frame 14. In one example, the exterior trim component is a molding 16 for the frame 14. For example, the molding 16 may be a weatherstrip, a decorative trim, combinations thereof, or the like. The clip 10 and molding 16 may be used for any window of the vehicle 12, such as those windows on doors of the vehicle 12, sun roofs, moon roods, rear sliding windows, etc. Moreover, the clip 10 may be utilized for any application (vehicular or not) that may require securing of a trim part to a frame.

While one example of the clip 10 has been described herein, the scope of the invention may be encompassed by designs other than the one shown in the Figures, and other equivalents of the clip 10 features are contemplated.

Figure 4:
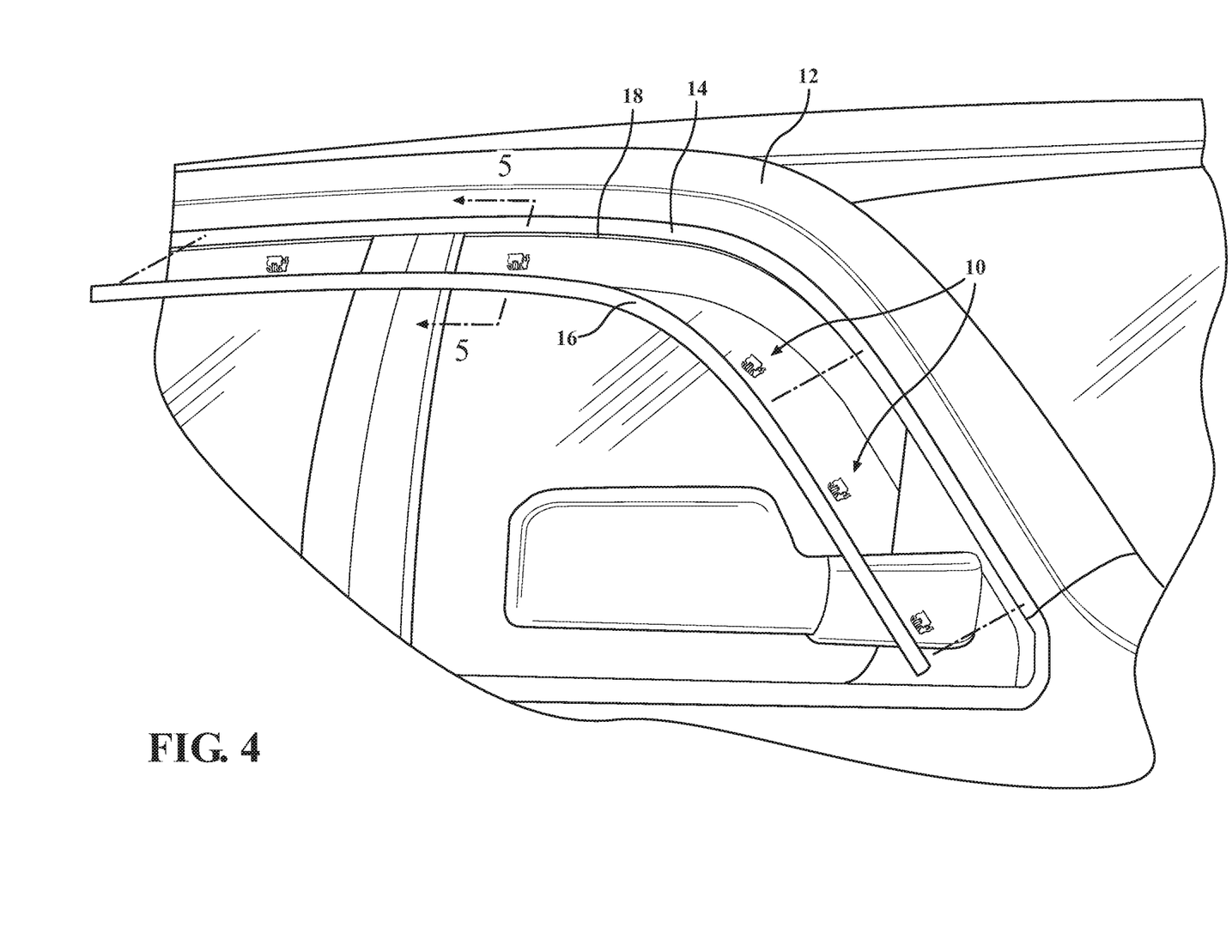
FIG. 4 illustrates an exploded view of the clip and a molding which receives the clip shown relative to a frame of a vehicle to which the retention clip and molding are installed.
Figure 5:
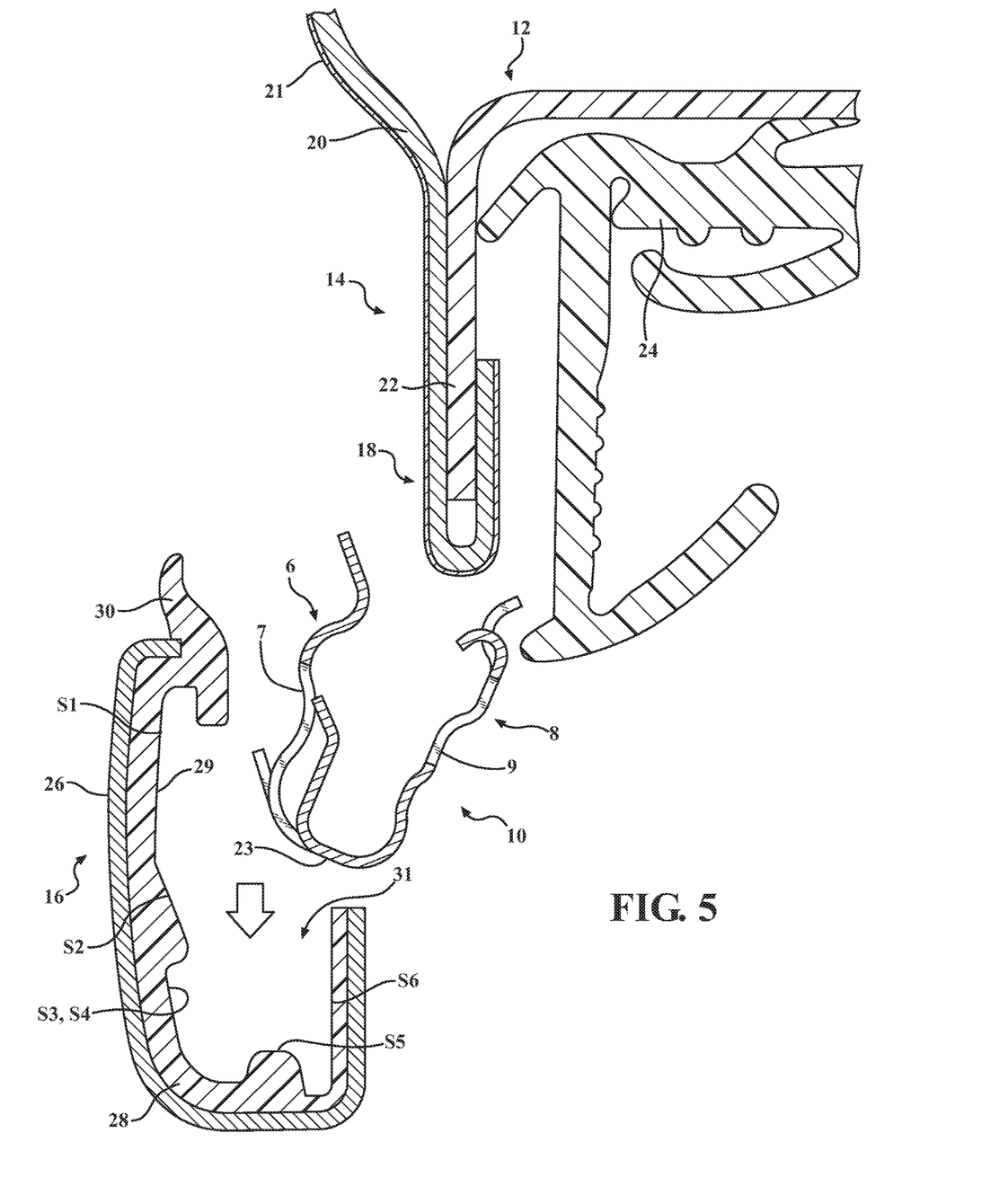
FIG. 5 is a cross-sectional view taken at section 5-5 from FIG. 4, showing the dip, the molding and the vehicle frame.

As shown in FIGS. 4 and 5, the clip 10 and molding 16 are shown in a pre-assembled configuration relative to the frame 14, for simplicity in illustration of the various features of each part. FIG. 5 is a cross-section of the clip 10, molding 16 and frame 14 taken at section 5-5 in FIG. 4. The frame 14 has a flange 18. The flange 18 may extend, in part or entirely, around a periphery of the frame 14 opening. In one example, the flange 18 is formed by an outer portion 20 and an inner portion 22 of sheet metal. The outer and inner portions 20, 22 are coupled to each other. In one example, the outer portion 20 is folded over the inner portion 22 and the portions 20, 22 are hemmed together. A rubber seal 24 is coupled to the inner portion 20. In some instances, a layer of paint 21 may be applied to the exterior surface of the flange 18. The flange 18 may be one integrally formed portion, instead of the separate outer and inner portions 20, 22 shown.

The molding 16 comprises an exterior portion 26 and an interior portion 28. The exterior portion 26 may comprise a finishing, such as a decorative, painted, or coated finish. The exterior portion 26 may comprise any suitable material formed by any suitable method, s as roll-formed steel. The interior portion 28 is coupled to the exterior portion 26 and may comprise any suitable material formed by any suitable method. For example, the interior portion 28 may comprise Polyporpelyne and be formed by co-extrusion. The co-extrusion can cover the entire interior portion 28 of the molding 16 to ensure galvanic barrier protection.

The interior portion 28 comprises an interior surface 29 defining a channel 31 into which the clip 10 is installed. The molding 16 comprises a lip 30, which integrally extends from the interior portion 28. The lip 30 also extends beyond a top of the exterior portion 26. The lip 30 is configured to directly abut the outer portion 20 of the frame 14. More specifically, the lip 30 is configured to press against the outer portion 20 thereby creating a seal with the outer portion 20 to channel water on the exterior of the vehicle and to minimize air infiltration to the interior of the vehicle 12. As will be described below, the clip 10 helps to maintain the lip 30 against the outer portion 20 to avoid air and water leakage.

Figure 6:
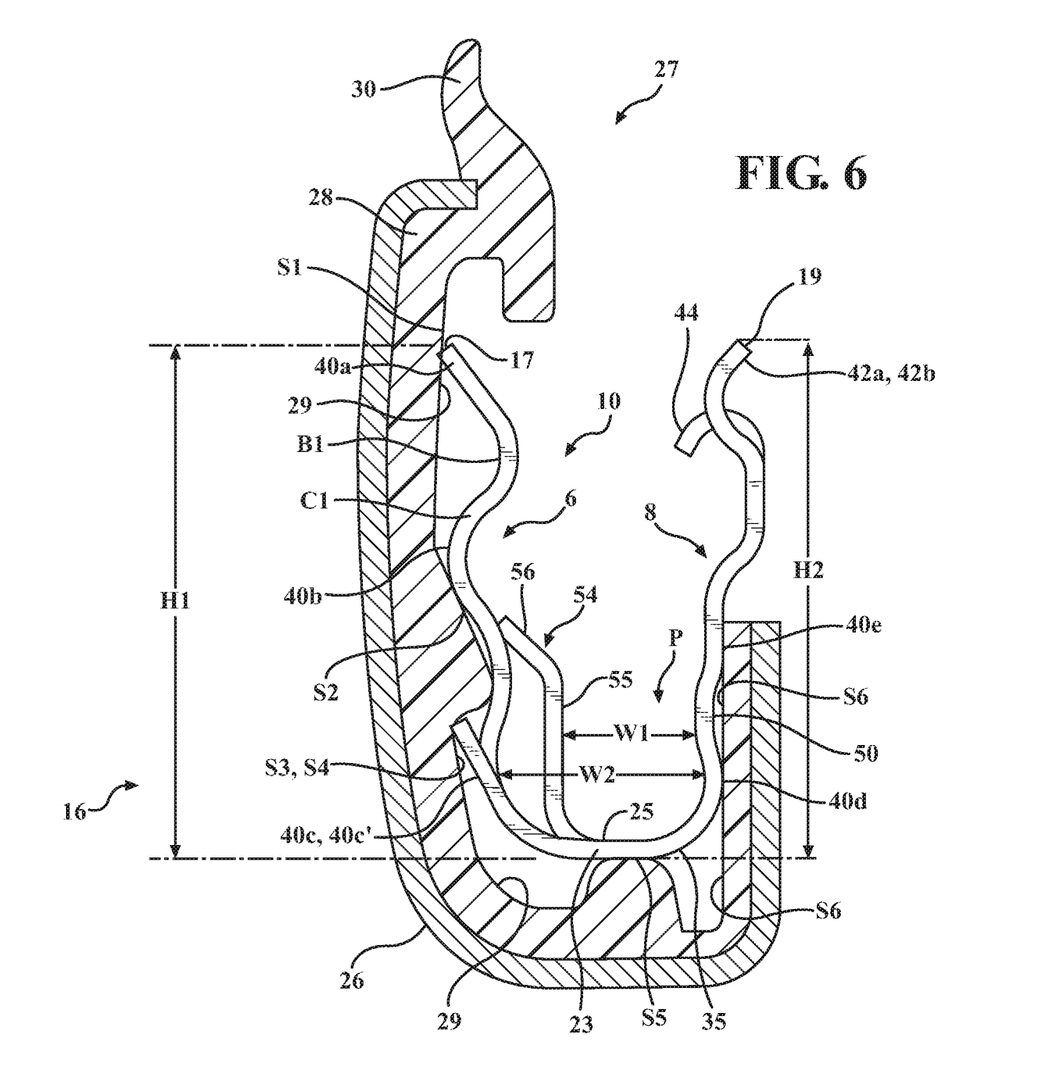
FIG. 6 is a side view of a trim assembly comprising the molding (viewed in cross-section) and the clip (elevation view) assembled into the molding.

As shown in FIG. 5, the clip 10 is configured to attach to the molding 16, and more specifically, to the interior portion 28 of the molding 16. As shown, the clip 10 is inserted into the channel 31 of the molding 16 in the direction shown by the arrow. Once inserted, the features of the clip 10 mechanically engage or interlock with the features of the interior portion 28 of the molding 16, as shown in FIG. 6.

The combination of the molding 16 and the clip 10 forms a trim assembly 27. The trim assembly 27 may comprise one or a plurality of clips 10, as shown in FIG. 4. The trim assembly 27 may be assembled with the one or more clips 10 prior to installation to the frame 14. When the trim assembly 28 is assembled with one or more clips 10, the trim assembly 27 slides over the flange 18 of the frame 14. Alternatively, the one or more clips 10 may be installed to the frame 14, then the molding 16 may be installed to the frame 14 and the one or more clips 10. In either instance, the clip 10 is configured to slide over the flange 18 of the frame 14 and forces a mechanical interlocking between the molding 16, the clip 10 and the frame 14. Aspects of the features of the clip 10 which enable this fit are described below.

Figure 1:
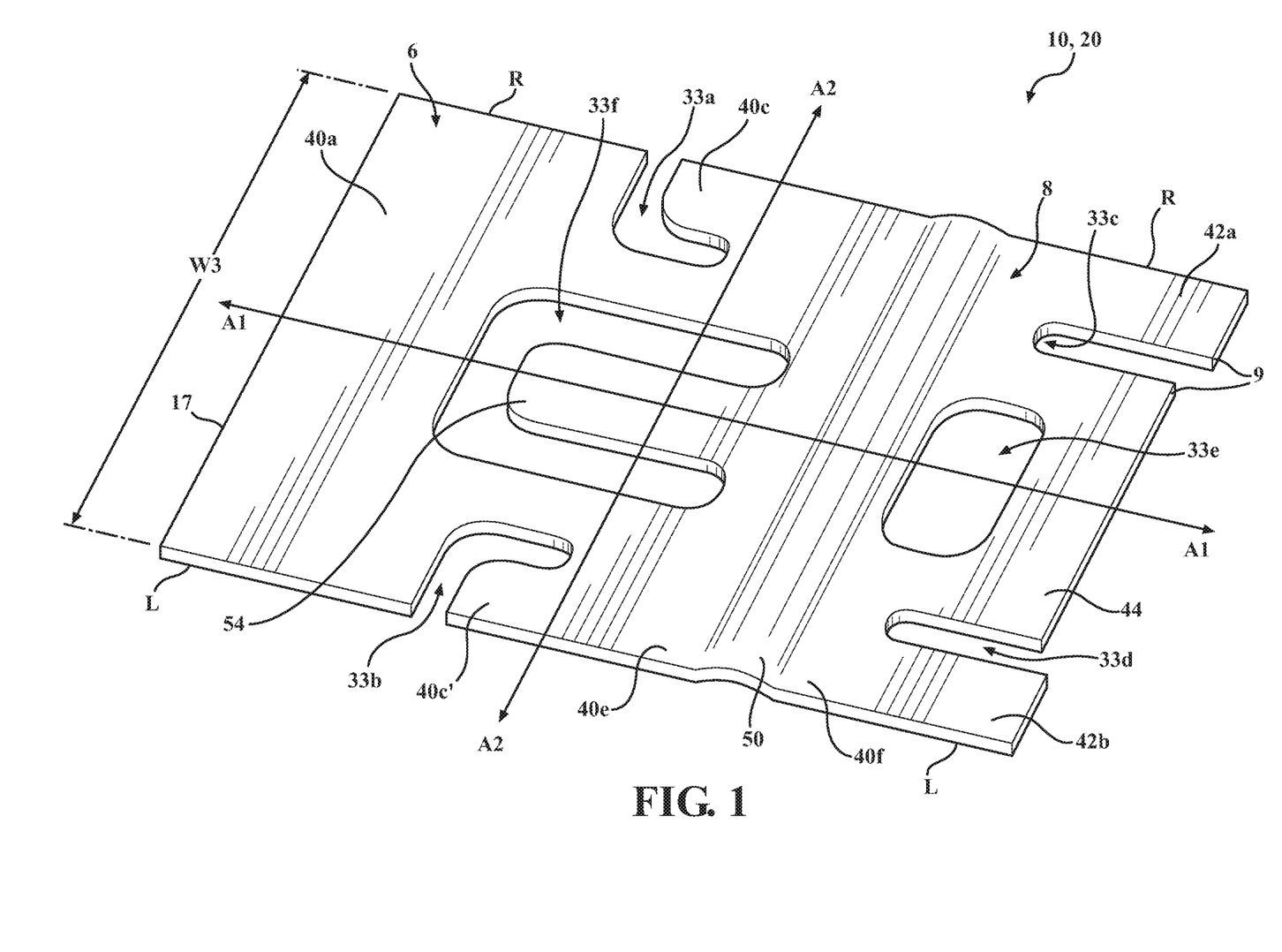
FIG. 1 is a perspective view of a blank from which a retention clip is formed.

The various components of the clip 10, according to one embodiment, are all integrally formed from a single, unitary blank 20. Referring to FIG. 1, the blank 20 of the clip 10 is shown. The blank 20 is bent, formed, or otherwise manipulated the form the shape of the clip 10. As can be seen in FIG. 1, the blank 20, and hence, the clip 10 is symmetrical along a long axis A1. The blank 20 may be formed using any suitable manufacturing process, e.g., stamping, metalworking, or the like. Various removed portions 33 of the blank 20 can be omitted from the blank 20 to form various features of the clip 10 described herein. In the example of FIG. 1, six removed portions 33a-33f are cut away from the blank 20 and these removed portions 33a-33f are isolated from each other. Removed portions 33e and 33f are symmetrical about the long axis A1. Removed portion 33a is symmetrical to removed portion 33b about the long axis A1. Removed portion 33c is symmetrical to removed portion 33d about the long axis A1. The clip 10 may be formed by removing more or less portions 33 than shown the FIG. 1, and the removed portions 33 may have shapes different from those specifically shown.

The blank 20, and hence the clip 10, may comprise any suitable material. In one example, the blank 20 comprises metal, and more specifically, steel, and more specifically, SAE 1050-1065 Steel with a 0.4+/−0.05 thickness. The clip 10 may comprise a common integral piece of metal. Alternatively, the clip 10 may comprise portions formed of different materials. The clip 10 may have a heat treatment applied thereto, such as by using isothermal heat treatments, e.g., Austempering. The clip 10 may be created, formed, or assembled using any other method besides using the blank 20.

When formed, the clip 10 may exhibit a resiliency under force/load so as to act as a biasing member, such as a leaf or spring clip, etc. When pulled apart due to force/load, the clip 10 has a tendency to pull back inwards towards the unloaded state of the clip 10. On the other hand, when squeezed due to force/load, the clip 10 has a tendency to open outwards towards the unloaded state of the clip 10. Thus, the clip 10 provides bi-directional resiliency.

Figure 2:
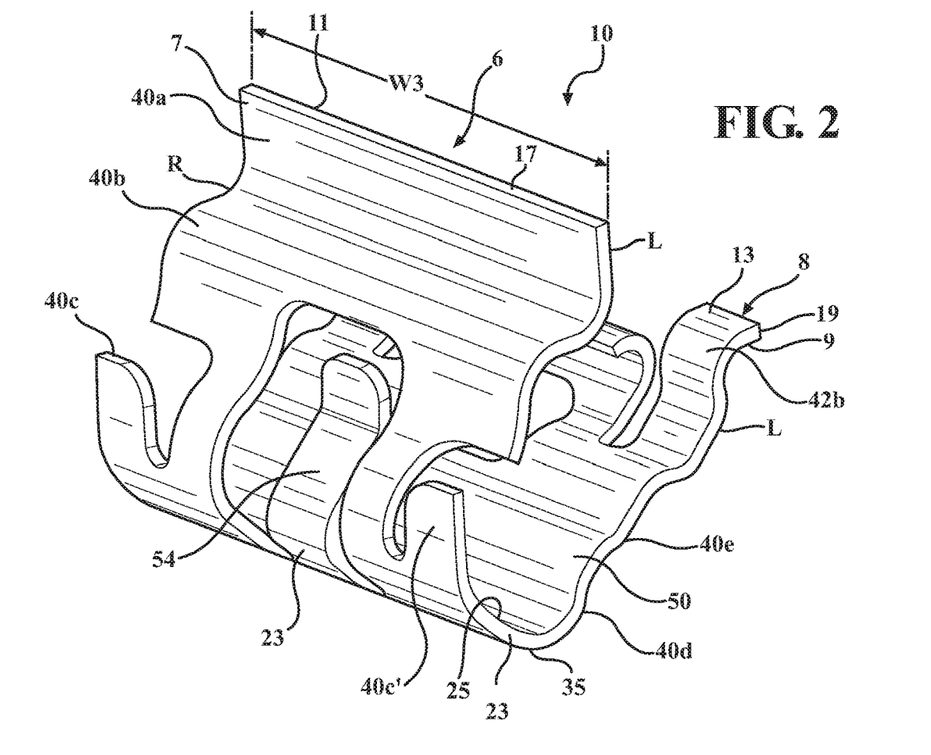
FIG. 2 is a perspective view of the clip.
Figure 3:
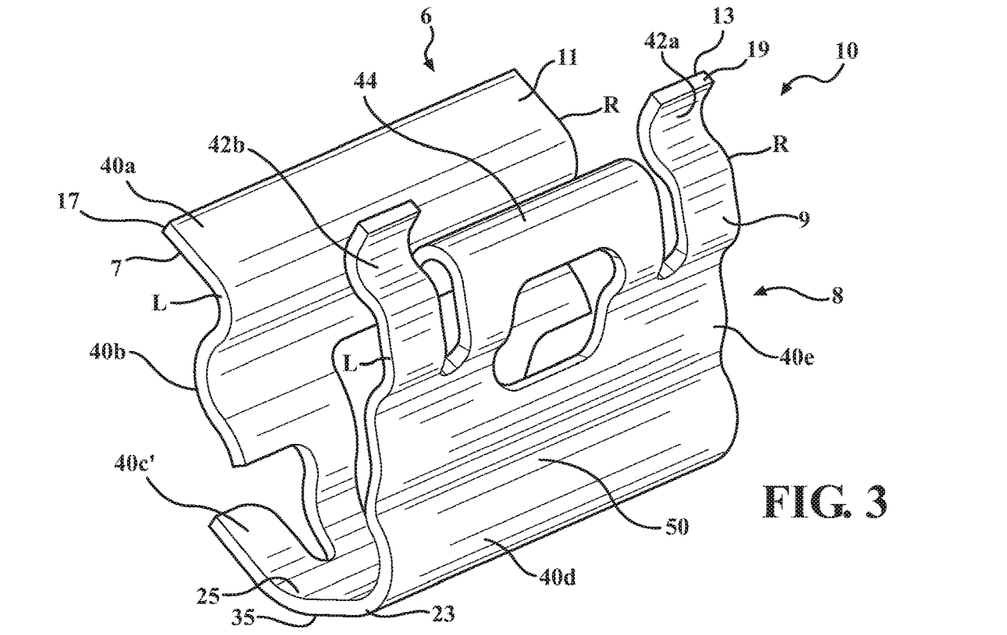
FIG. 3 is another perspective view of the clip of FIG. 2.

As best shown in FIGS. 2-3, the clip 10 comprises a first side wall 6 and a second side wall 8. The first side wall 6 comprises an exterior surface 7 and an interior surface 11 on the opposite side of the exterior surface 7. The second side wall 8 comprises an exterior surface 9 and an interior surface 13 on the opposite side of the exterior surface 9. The interior surface 11 of the first side wall 6 faces the interior surface 13 of the second side wall 8.

The exterior surfaces 7, 9 of the first and second side walls 6, 8 are shaped to engage the clip 10 to the molding 16. Specifically, the exterior surfaces 7, 9 engage the interior portion 28 of the molding 16, and more specifically, the interior surface 29 of the interior portion 28.

The exterior surface 7 of the first side wall 6 that faces the exterior of the vehicle (away from the frame 14) when the trim assembly 27 is installed. The exterior surface 9 of the second side wall 8 faces the interior of the vehicle when the trim assembly 27 is installed.

When viewed from the side, the first and second side walls 6, 8 generally extend in the same direction, and may extend substantially parallel to one another. However, the first and second side walls 6, 8 may not be precisely parallel because of the various curved features of the side walls 6, 8, which will be described below.

The first side wall 6 terminates at a distal edge 17 and the second side wall 8 terminates at a distal edge 19. The distal edges 17, 19 of the side walls 6, 8 are spaced apart from one another to allow passage for insertion of the clip 10 over the flange 18 of the frame 14. The distal edges 17, 19 can be planar, curved, bent, or any combination thereof. In the example shown, the distal edge 17 of the first side wall 6 is a continuous flat edge and the distal edge 19 of the second side wall 8 is formed by separated segments. The distal edge 17 of the first side wall 6 is bent in a direction away from the second side wall 8 and is configured to engage the interior surface 29 of the molding 16. The distal edges 17, 19 may have various configurations other than those shown in the Figures.

A base 23 of the clip 10 connects the first and second side walls 6, 8. The base 23 connects the side walls 6, 8 at an end of the clip 10 that is opposite to the distal edges 17, 19. The base may be an integral bend between the first and second side walls 6, 8. In cross-section, the base 23 is transverse and substantially perpendicular to the first and second side walls 6, 8. However, the base 23 may not be precisely perpendicular to the first and second side walls 6, 8 because of the bending of the base 23. In cross-section, the side walls 6, 8 and base 23 form a U-shape like configuration.

As shown in FIGS. 2 and 3, the base 23 comprises an interior surface 25 facing towards an interior of the clip 10. The base 23 also comprises an exterior surface 35 opposite the interior surface 25 of the base 23. The exterior surface 35 of the base 23 may be planar, curved, or a combination thereof. When curved, the exterior surface 35 may comprise a distal-most portion. As shown in FIG. 6, the first side wall 6 has a height RI defined between the distal-most portion of the exterior surface 35 of the base 23 and the distal edge 17 of the first side wall 6. The second side wall 8 has a height H2 defined between the distal-most portion of the exterior surface 35 of the base 23 and the distal edge 19 of the second side wall 8. In one example, the heights H1, H2 of the first and second side walls 6, 8 are equal to each other within a range of +/−1.0 mm, or within a range of +/−0.5 mm. In one example, H1 is 10.2 mm and H2 is 10.4 mm.

As best shown in FIGS. 1, 2, 5 and 6, the clip 10 comprises a tab 54 that extends from the base 23. The tab 54 is configured to flex, like a spring clip. The tab 54 extends towards the interior of the clip 10 and is disposed between the side walls 6, 8. The tab 54 is symmetrical about the long axis A1 of the blank 20. The tab 54 can be formed by a removed portion 33f that is a closed U-shaped slot cut away from the blank 20. Although the tab 54 is formed from material that is used to form the base 23 as well as the first side wall 6, the tab 54 extends from the base 23 because the tab 54 is bent at a location proximate the base 23 and between the side walls 6, 8.

As shown in FIG. 6, tab 54 has a body portion 55 and a distal portion 56 that extends from the body portion 55 in a direction towards the first side wall 6. The body portion 55 of the tab 54 extends in a substantially perpendicular fashion into the interior of the clip 10. In one example, the body portion 55 extends from the base 23 at an angle defined in a range between 85 to 95 degrees relative to the base 23. The body portion 55 is planar to guide and engage a planar part of the flange 18. In one example, the body portion 55 extends from a location at the base 23 that is closer to the first side wall 6 than the second side wall 8. The tab 54 terminates at a distal end of the distal portion 56. The tab 54 has a height defined between the exterior surface 35 of the base 23 and the distal end of the distal portion 56. In one example, the height of the tab 54 is less than the height H1, H2 of each of the side walls 6, 8 of the clip 10. More specifically, the height of the tab 54 may be less than one half of H1, H2. However, the tab 54 may be taller or shorter than shown, based on the specific configuration of the flange 18 to which the clip 10 engages. The distal portion 56 is bent at about a 45 degree angle relative to the body 55 of the tab 54. The distal portion 56 is bent to facilitate provide increased clearance and/or guidance for the flange 18 during installation of the clip 10 or trim assembly 27 to the frame 14.

The clip 10 also comprises a bump 50. The bump 50 may be integrally formed from the second side wall 8 by a bending of the second side wall 8. Alternatively, the bump 50 may be component added to the clip 10, such as a flexible material, e.g., rubber, plastic, etc. The bump 50 is also provided on the interior surface 13 of the second side wall 8 and extends towards an interior of the clip 10. The bump 50 may have any suitable configuration for providing an indentation, or protrusion towards the interior of the clip 10. The bump 50 may have a cross-section that is a half circle, half ellipse, half rectangle, half trapezoidal, or the like. As shown in FIG. 1, the bump 50 extends along the length of the short axis A2 of the blank 20 and the bump 50 may be symmetrical about both the long and short axes A1, A2.

The height of the tab 54 may be design to at least reach or extend beyond the height of the bump 50 on the second side wall 8. As shown in FIG. 6, the tab 54 and the interior surface 13 of the second side wall 8 collectively define a pocket P that is sized to fit the flange 18 of the frame 14. The bump 50 and the interior surface 25 of the base 23 also at least partially define this pocket Between the tab 54 and the hump 50, the pocket has a width W1. The width W1 between these components 54, 50 is less than a width W2 of a primary width of the clip 10 defined between the first and second side walls 6, 8. The primary width W2 is larger than and encompasses the pocket P. The width W1 of the pocket P is sized to accommodate the flange 18. The primary width W2 is sized to fit the clip 10 the interior surface 29 of the molding 16. As will be described below, the tab 54 and the bump 50 are configured to flex when the clip 10 and/or the trim assembly 27 are installed to the frame 14 to provide a pre-load to retain the trim assembly 27 to the frame 14 as well as to accommodate various tolerances of the flange 18.

Referring back to FIGS. 1-3, the first and second side walls 6, 8 each comprise a right side R and an opposing left side L. A width W3 of the clip 10 is defined between right side R and opposing left side L of each of the first and second side walls 6, 8. When viewed with respect to the blank 20, in FIG. 1, the first and second side walls 6, 8, the base 23, and the tab 54 are symmetrical about the long axis A1 that bisects the width W3 of the clip 10. When viewed after formation of the clip 10, and with respect to FIGS. 2 and 3, the first and second side walls 6, 8, the base 23, and the tab 54 are symmetrical about a plane defined through the long axis A1, wherein the plane bisects the width W3 of the clip 10.

In FIG. 6 the clip 10 is retained to the molding 16 thereby forming the trim assembly 27. More specifically, the clip 10 is inserted into the channel 31 of the molding 16 in the direction shown by the arrow from FIG. 5. After insertion, each of the exterior surfaces 7, 9 of the first and second side walls 6, 8 engages the interior surface 29 of the molding 16. The first and second side walls 6, 8 are configured to flex inwards due to force applied inwards by the interior surface 29 of the molding 16. This forces is applied because the clip 10 has a width slightly greater than a width of the channel 31 of the molding 16. Each of the exterior surfaces 7, 9 of the side walls 6, 8 is configured to apply a biasing force outwards against the interior surface 29 of the molding for securing the clip 10 to the molding 16.

With reference to FIGS. 2, 3 and 6, the clip 10 comprises several features 40a-40e which are configured to contact and apply force to the interior surface 29 of the molding 16. These features 40a-40f are shaped, bent, or otherwise formed to conform to or engage with the interior surface 29. Features 40a-40c are formed on or by the first side wall 6. Features 40d and 40e are formed on or by the second side wall 8.

Feature 40a is the distal edge 17 of the first side wall 6 and feature 40a flares outward by a bending B1 in the clip 10. As shown in FIG. 6, feature 40a is adapted to bias into engagement with a first surface S1 (see FIG. 5) of the interior surface 29 of the molding 16. The first surface S1 has a substantially flat configuration, but can have curvature.

Adjacent to feature 40a, feature 40b is provided by the first side wall 6 and is formed by an S-Shaped curve C1 of the first side wall 6 that integrally extends from the bending B1. As show in FIG. 6, feature 40b is adapted to bias into engagement with a second surface S2 of the interior surface 29 of the molding 16. The second surface S2 defines a lobe that extends into the interior slot of the molding 16.

Adjacent to feature 40b, feature 40c is also disposed on the first side wall 6 of the clip 10 and at the distal end of the S-shaped curve C1. Hence, feature 40b is disposed between features 40a and 40c. Feature 40c comprises a wing that integrally extends from the body of the clip 10. FIG. 6 shows wing 40c on one side of the clip 10. The clip 10 includes an opposing wing 40c' disposed on the other side of the clip 10 in a mirror-symmetric fashion (see FIG. 2). The wings 40c, 40c' extend beyond the first side wall 6. As shown in FIG. 1, L-shape removed portions 33a and 33b are cut away from the blank 20 to respectively form the shape of the wings 40c, 40c'. As show in FIG. 6, the wings 40c, 40c' each comprise a distal end that is adapted to bias into engagement with third S3 and fourth S4 surfaces of the interior portion 28 of the molding 16. The third and fourth surfaces S3, S4 are defined below the lobe of the second surface S2. The third and fourth surfaces S3, S4 may be the same surface of the interior surface 29 but are defined at different locations (in and out of the page of FIG. 6).

The exterior surface 35 of the base 23 rests upon a fifth surface S5 of the interior surface 29 of the molding 16. The fifth surface S5 is defined by a protrusion at the bottom of the molding 16 that extends into the channel 31.

Features 40d and 40e are formed on the second side wall 8 of the clip 10 and are defined on opposing sides of the bump 50. Features 40d and 40e are biased into engagement with a sixth surface S6 of the interior surface 29 of the molding 16. The sixth surface S6 is substantially planar.

The clip 10 further includes hooks 42a, 42b and 44 located at the distal end of the second side wall 8. Hooks 42a and 42b are bent outward, i.e., towards the exterior of the clip 10. Hook 44 is bent inward, i.e., towards the interior of the clip 10. As shown in FIG. 1, hooks 42a, 42b can be formed by I-shaped removed portions 33c and 33d, respectively, and are symmetrical along the long axis A1 and are mirror-images of one another. Hook 44 is disposed between hooks 42a, 42b and is forms an upside-down U-shaped configuration. To enable bending of the hook 44, a removed portion 33e, which is a closed slot, is formed into the blank 20.

Figure 7:
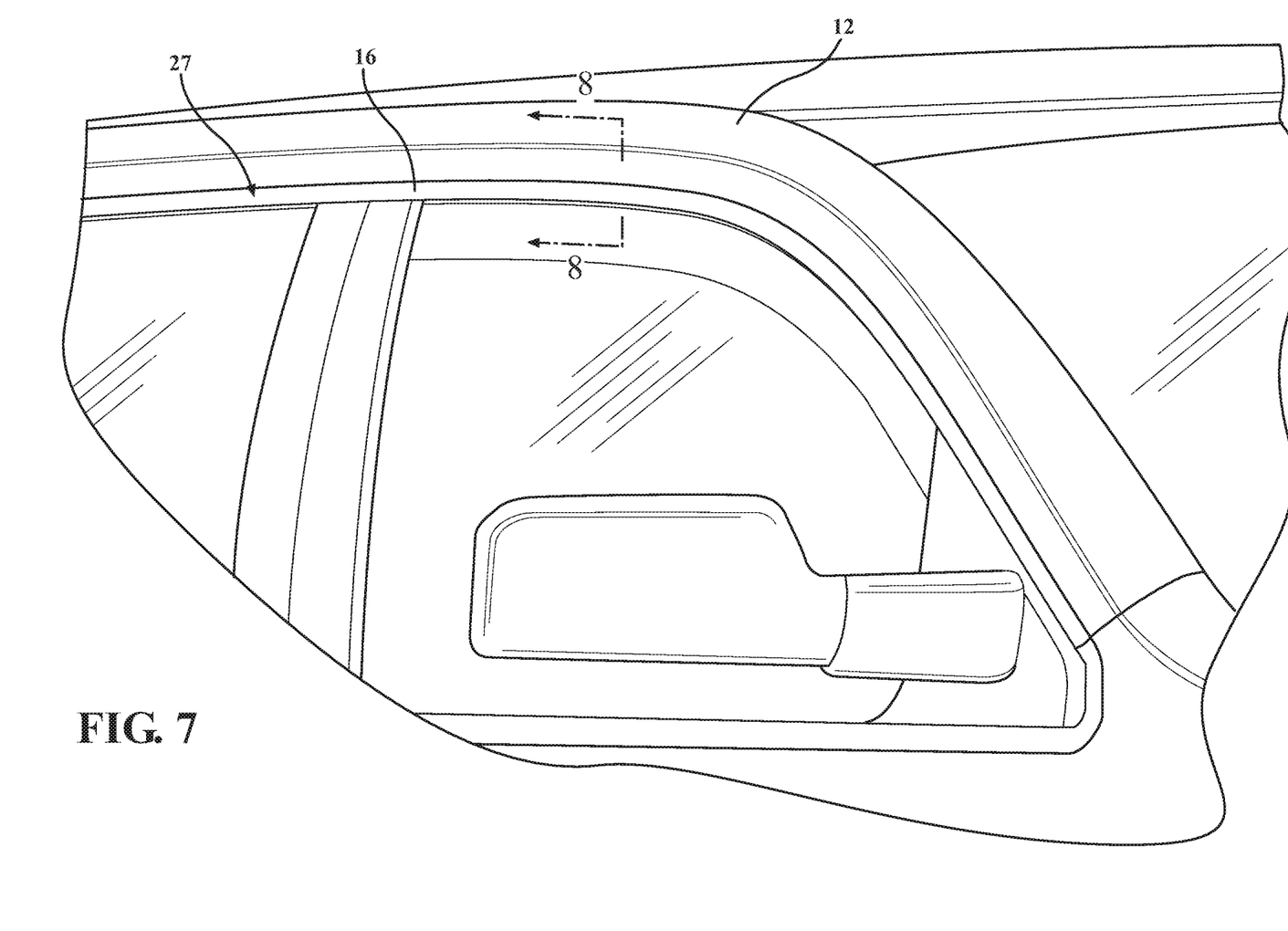
FIG. 7 illustrates the trim assembly of FIG. 6 installed to the vehicle frame.
Figure 8:
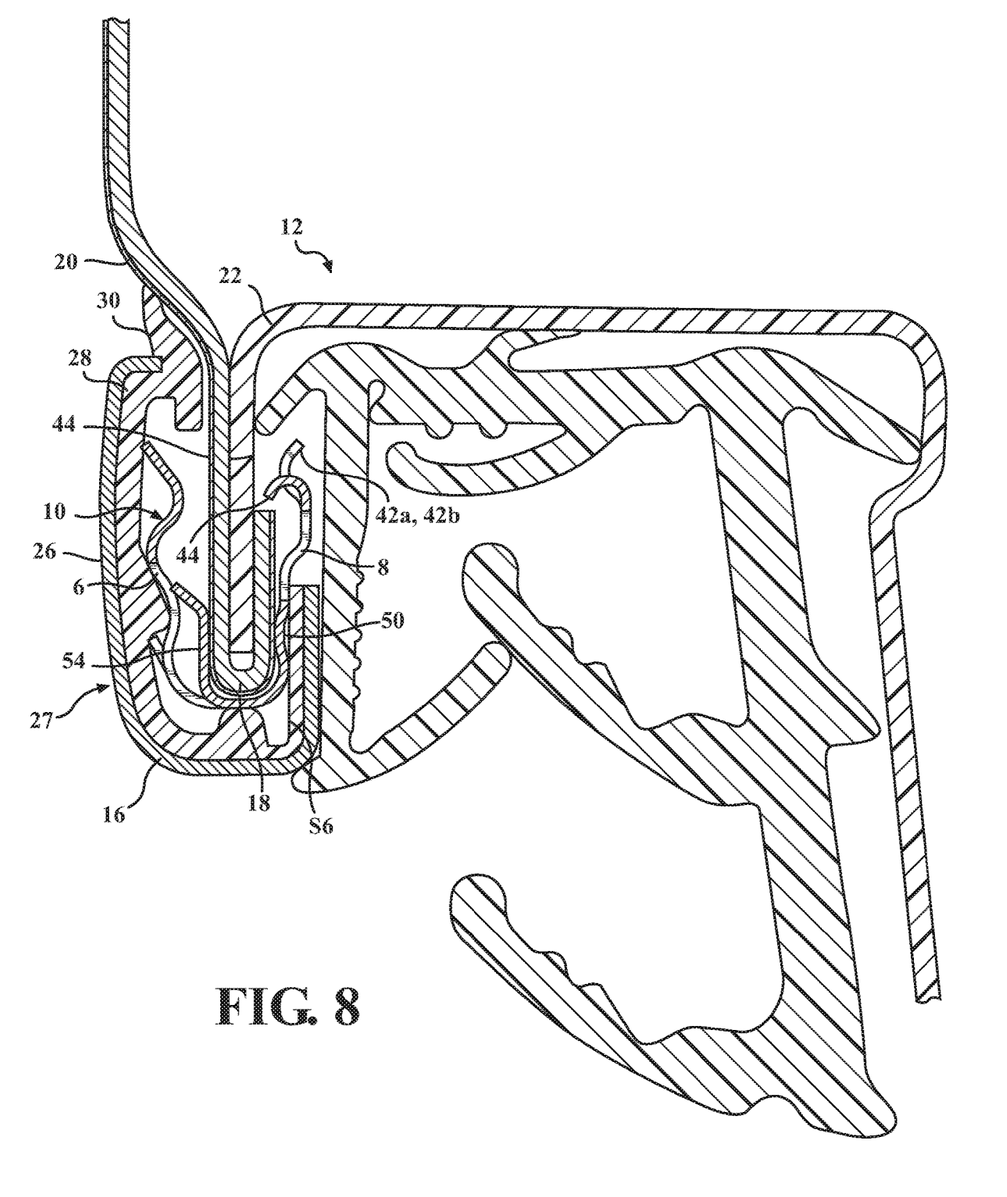
FIG. 8 is a cross-sectional view taken at section 8-8 from FIG. 7, showing the trim assembly installed to the vehicle frame.

As shown in FIG. 7, the trim assembly 27 is installed to the vehicle frame 14. FIG. 8 is a cross-sectional view of the trim assembly 27 taken at section 8-8 in FIG. 7. Engagement between the clip 10, the molding 16 and the vehicle frame 14 will now be described with reference to FIG. 8. As shown, the flange 18 is disposed within both the primary cavity of the clip 10 and the pocket P of the clip 10. Insertion of the flange 18 presses against the second side wall 8, and more specifically, the bump 50. The flange 18 also presses against the tab 54 and the tab 54 applies a biasing force against the flange 18. In turn, the exterior surfaces 7, 9 of the side walls 6, 8 are further biased against the interior surface 29 of the molding 16 thereby securely retaining the trim assembly 27 to the frame 14. Specifically, the bump 50 is squeezed between the outer sheet metal 20 fold of the flange 18 and the interior surface S6 of the molding 16. The bump 50 is configured to flex between surfaces 20 and S6. The bump 50 and the tab 54 are configured to flex under load applied by the flange 18 and are both configured to apply opposing biasing forces against the flange 18. In so doing, the bump 50 and the tab 54 provide significant design improvement by accounting for variations in the thickness of the flange 18 due to hemming inconsistencies.

The bump 50 and tab 54 also provide retention of the clip 10 to the flange 18 by enabling a compression-fit between the interior surface 28 of the molding 16 and the flange 18. The bump 50 and the tab 54 also create a preload on the lip 30 to push the lip 30 against outer sheet 20 to prevent air/water intrusion. Through contact at the bump 50 (between the molding 16 and the flange 18) and pre-loaded contact between the lip 30 and the outer sheet metal 20, the clip 10 enables retention of the molding 16 to the frame 14.

Hook 44 is configured to bend towards the portion of the outer sheet metal 20 that is folded over the inner portion 22 of sheet metal. Hooks 42a, 42b are configured to bend towards a corner formed by the inner sheet metal 22 adjacent the rubber seal 24. The hooks 42, 44 occupy the space formed by the inner sheet metal 22. The hooks 42, 44 provide guidance during assembly, provide stability to the connection, and prevent the molding 16 from separating from the vehicle 14 in the event of failure. For example, hook 44 can engage the distal end of the outer sheet metal 20 and hooks 42a, 42b can engage the distal end of the molding 16 (at the end of surface S6).

As understood from the features of the clip 10 as described in the specification and Figures, it should be appreciated that the clip 10 securely attaches the molding 16 to the frame 14, accounts for variable mechanical tolerances of the flange 18, and securely maintains the lip 20 of the molding 16 to the frame 14. Moreover, the clip 10 has the ability to be packaged in tight constraints. Specifically, the clip 10 can be used in moldings 16 that are smaller than typical moldings, which are much larger attached using a different type of clip). There are trends toward keeping moldings small. Having such a clip 10, which is robust and for tight packaging, provides a solution for this trend in reduced molding size.

The clip 10 may be utilized in orientations other than shown and described herein. For example, FIGS. 5, 6 and 8 may be inverted vertically such that the clip 10 securely attaches the molding 16 to the frame 14 from above. In other words, the window flange 18 may be for a lower portion of a window opening and may extend upwards. The clip 10 and molding 16 can be placed over a top of the window flange 18 from above. Hence, any terms of relativity utilized herein, such as top, bottom, etc., are not intended to limit the geometry, characteristics, or functionality of the clip 10. Advantages other than those described herein may be fully understood from the specification and Figures.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A clip for securing a molding to a flange of a vehicle, the clip comprising:
    a first side wall and a second side wall each comprising an interior surface and an opposing exterior surface, and the interior surfaces face one another and the exterior surfaces are shaped to engage the molding, and each of the first and second side walls terminate at a distal edge providing a passage for the flange of the vehicle;
    a base connecting the first and second side walls at an end that is opposite the distal edges; and
    a tab extending from the base and being disposed between and spaced apart from the first and second side walls, and wherein the tab and the interior surface of the second side wall define a pocket sized to fit the flange of the vehicle, and wherein the interior surface of the second side wall comprises a bump directly across from the tab that extends towards and faces the tab, and wherein the tab and the bump are configured to engage the flange of the vehicle.

2. The clip of claim 1, wherein the first and second side walls are configured to flex and each of the exterior surfaces of the first and second side walls is configured to apply a biasing force against an interior surface of the molding for securing the clip to the molding.

3. The clip of claim 1, wherein the tab is configured to flex and is configured to apply a biasing force against the flange of the vehicle, and the bump is configured to apply a biasing force against the flange of the vehicle that opposes the biasing force applied by the tab for securing the clip to the flange of the vehicle.

4. The clip of claim 1, wherein the distal edge of the first side wall is bent in a direction away from the second side wall and wherein the distal edge of the first side wall is configured to engage the molding.

5. The clip of claim 1, further comprising a pair of wings on opposing sides of the tab and that extend beyond the first side wall and wherein each of the wings comprises a distal end that is configured to engage the molding.

6. The clip of claim 1, wherein the bump is integrally formed from the second side wall by a bending of the second side wall.

7. The clip of claim 1, wherein the bump is configured to flex.

8. The clip of claim 1, wherein the base comprises an interior surface further defining the pocket and an exterior surface opposite the interior surface of the base, and the first side wall has a height defined between the exterior surface of the base and the distal edge of the first side wall, and the second side wall has a height defined between the exterior surface of the base and the distal edge of the second side wall, and wherein the height of the first and second side walls are equal to each other within a range of +/−1 mm.

9. The clip of claim 8, wherein the tab terminates at a distal end and the tab has a height defined between the exterior surface of the base and the distal end of the tab, and wherein the height of the tab is less than the height of each of the first and second side walls.

10. The clip of claim 1, wherein the base and the first side wall define a cut-out collectively forming material of the tab and wherein material of the tab is bent such that the tab integrally extends from the base and is disposed between the interior surfaces of the first and second side walls.

11. The clip of claim 1, wherein the tab comprises a body portion that is planar and a distal portion extending from the body portion in a direction towards the first side wall.

12. The clip of claim 1, wherein the base is further defined as a bend integrally connecting the first and second side walls.

13. The clip of claim 1, wherein the first and second side walls each comprise a right side and an opposing left side, and a width of the clip is defined between right side and opposing left side of each of the first and second side walls, and wherein the first and second side walls, the base, and the tab are symmetrical about a plane that bisects the width of the clip.

14. The clip of claim 1, wherein the first and second side walls, the base, the tab, and the bump are integrally formed from a common piece of material.

15. A trim assembly for attaching to the flange of the vehicle, the trim assembly comprising the molding and the clip of claim 1, wherein the molding comprises an interior surface and the exterior surfaces of the clip are coupled to the interior surface of the molding to secure the clip to the molding.

16. A trim assembly for attaching to a flange of a vehicle, the trim assembly comprising:
    a molding comprising an interior surface; and
    a clip comprising:
        a first side wall and a second side wall each comprising an interior surface and an opposing exterior surface, and the interior surfaces face one another and the exterior surfaces are coupled to the interior surface of the molding to secure the clip to the molding, and each of the first and second side walls terminate at a distal edge providing a passage for the flange of the vehicle;
        a base connecting the first and second side walls at an end that is opposite the distal edges; and
        a tab extending from the base and being disposed between and spaced from the first and second side walls, and wherein the tab and the interior surface of the second side wall define a pocket sized to fit the flange of the vehicle, and wherein the interior surface of the second side wall comprises a bump directly across from the tab that extends towards and faces the tab, and wherein the tab and the bump are configured to engage the flange of the vehicle for securing the trim assembly to the flange of the vehicle.

17. The trim assembly of claim 16, wherein the first and second side walls are configured to flex and each of the exterior surfaces of the first and second side walls is configured to apply a biasing force against the interior surface of the molding to secure the clip to the molding.

18. The trim assembly of claim 16, wherein the tab is configured to flex and is configured to apply a biasing force against the flange of the vehicle, and the bump is configured to apply a biasing force against the flange of the vehicle that opposes the biasing force applied by the tab for securing the trim assembly to the flange of the vehicle.

19. The trim assembly of claim 16, wherein the distal edge of the first side wall is bent in a direction away from the second side wall and towards the interior surface of the molding, and wherein the distal edge of the first side wall is engaged with interior surface of the molding to secure the clip to the molding.

20. The trim assembly of claim 16, wherein the clip further comprises a pair of wings on opposing sides of the tab and that extend beyond the first side wall and wherein each of the wings comprises a distal end that is engaged with interior surface of the molding to secure the clip to the molding.

\* \* \* \* \*